UNITED STATES PATENT OFFICE.

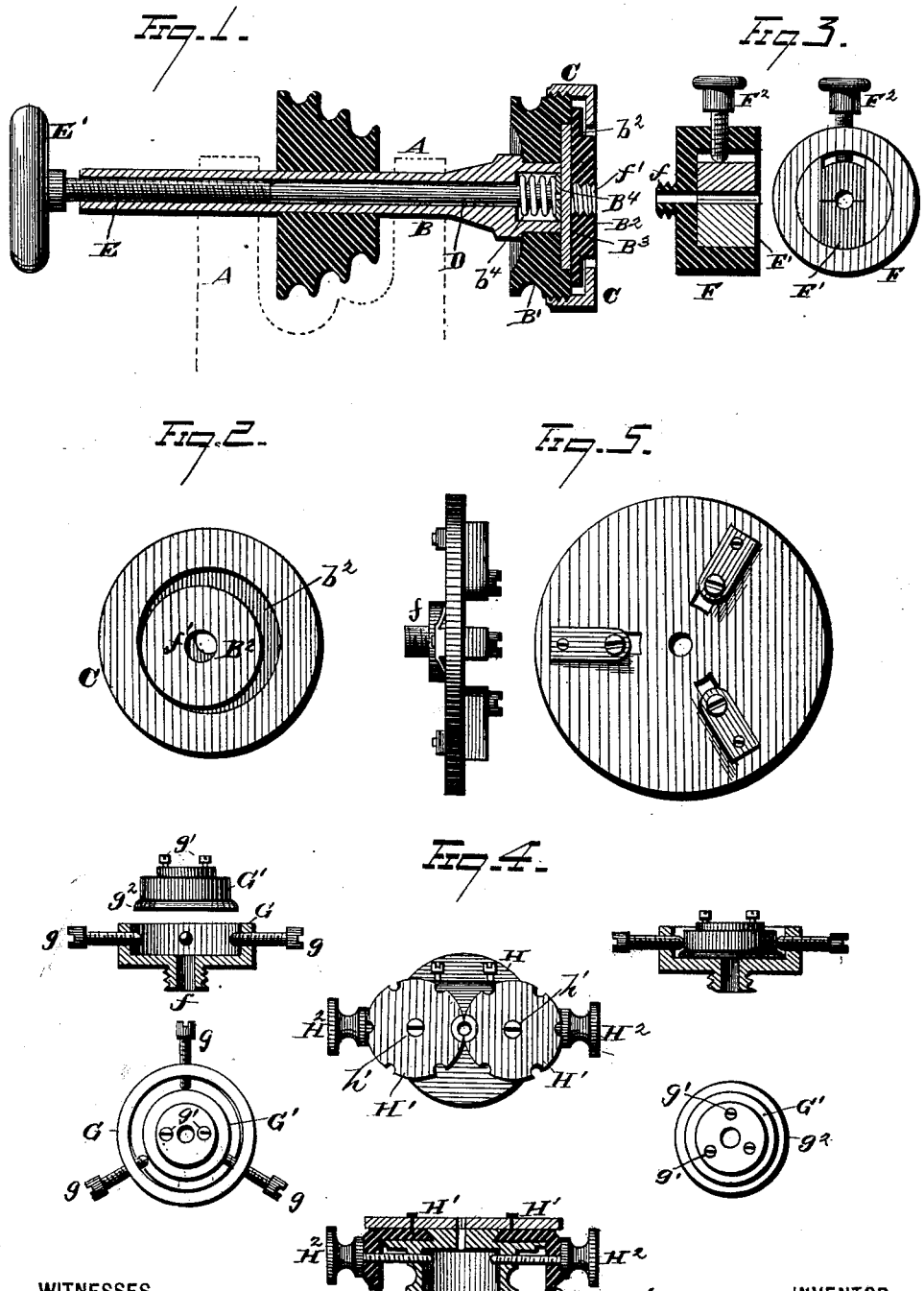

JOSEPH KESSELMEIER, OF GALION, OHIO.

IMPROVEMENT IN WATCH-MAKERS' LATHES.

Specification forming part of Letters Patent No. 220,291, dated October 7, 1879; application filed June 10, 1879.

*To all whom it may concern:*

Be it known that I, JOSEPH KESSELMEIER, of Galion, in the county of Crawford and State of Ohio, have invented certain new and useful Improvements in Watch-Makers' Lathes; and I do hereby declare the following to be a full, clear, and exact description of the invention, such as will enable others skilled in the art to which it pertains to make and use it, reference being had to the accompanying drawings, which form part of this specification.

My invention relates to a new and useful improvement in lathes designed more especially for jewelers' lathes and such as are designed for fine work, though equally well adapted for any other kind of turning-lathes.

My invention consists in the peculiar construction and combination of parts in a lathe-chuck, as will be hereinafter described, and pointed out in the claims, whereby a device, when fastened in a chuck, may be centered by simply bringing a tool or other object against its outer surface, the loose chuck sliding within the head until the device is accurately centered, at which time the chuck is securely clamped by a set-screw working through the end of the spindle.

In the drawings, Figure 1 is a longitudinal central section of a lathe-spindle and chuck embodying my invention. Fig. 2 is a view looking against the end of the chuck. Fig. 3 is an end view and section, representing attachments to the chuck; Fig. 4, a similar view, representing other attachments. Fig. 5 represents still another attachment to the lathe-chuck.

Heretofore lathes have ordinarily been made with various forms of positive mechanism for centering the article to be turned or drilled; but all such positive mechanisms are practically incapable of adjustment to an accurate center; and the object of my invention is to produce a chuck which shall accurately center the article by bringing a tool or other device to bear upon it, thereby adapting it for the nice adjustment required in jewelers' lathes, and for other similar nice work.

In the said drawings, A is any suitable lathe-frame, which, however, forms no part of my invention. B is the spindle. The spindle B is provided with an enlarged head, $B^1$, screw-cut to receive a suitable cap, C, so that the head $B^1$, together with the cap, form a recessed head for the spindle. $B^2$ is a loose plate, with its flanged portion $b^2$ projecting beneath the cap C into the recess $b$. The plate $B^2$ being smaller than the interior of the cap C, and the portion which projects through the cap being smaller than the orifice through which it projects, this plate $B^2$ will, therefore, have a free motion, and may slide in any direction within the head. $B^3$ is another plate, which rests between the plate $B^2$ and the head $B^1$. It serves the purpose simply of a snug backing to receive the wear occasioned by the plate $B^2$, and to distribute the pressure upon the said plate $B^2$. $B^4$ is a small washer, against which the spring $b^4$ bears, which spring gives sufficient friction to the different parts that they will turn with the lathe-spindle, yet will yield to the pressure of a tool or other device in centering the article chucked. D is a follower, against which the tightening-screw E bears. $E'$ is a suitable hand-wheel for tightening the chuck.

The operation is very simple, and is as follows: Suppose a device to be turned or drilled is properly secured in the jaws or vise shown in Fig. 3. This vise is provided with a shank, $f$, which is adapted to screw into a screw-tapped orifice, $f'$, in the movable plate $B^2$. The vise having been thus attached to the chuck, the spring $b^4$ will, by its pressure against the plate $B^4$, cause sufficient friction between the plate $B^2$ and the cap C that the vise will be caused to turn with the spindle; yet the friction is not so great but that the operator, by bringing a tool or other suitable device against the article to be turned, may cause the plate $B^2$ to slide so as to accurately center the article in the chuck. When thus centered a turn upon the tightening-screw E will bind the parts snugly together and hold them in place.

In Fig. 3 is shown an ordinary vise, consisting of the frame F, provided with the movable jaws $F^1$ and set-screw $F^2$, there being a screw-shank, $f$, to fit the orifice $f'$ in the plate $B^2$.

In Fig. 4 is shown another form of vise adapted for holding certain parts to be turned or drilled. This consists of an annular ring or frame, G', provided with screws $g^1$, for holding the device in place. The frame G' is adapted to be inserted into a frame, G, where it is held in place by the set-screws $g$ setting in over the flange $g^2$. The frame G is provided with the screw-shank $f$, adapted to fit into the orifice $f'$ in the plate $B^2$.

As shown in Fig. 4, various forms of primary clamp or vise are represented. They may be formed as shown at G; or, for other kinds of work, I may use a clutch such as is shown at H, which represents a frame or support having two sliding jaws $H^1$. The jaws $H^1$ have formed upon their edges a number of openings, each corresponding with different sizes of articles to be clamped between them. These circular jaws $H^1$ may be turned about their pivots $h'$, so as to bring any size of opening into operation.

Suitable set-screws $H^2$ serve to force the jaws together. This clutch is like the clutches G' formed to set into the frame G, in which it may be clamped by the clamp-screws $g$, and be attached to the plate $B^2$.

In Fig. 5 is represented an ordinary lathe-jaw, which is likewise provided with the screw-shank $f$.

I do not limit myself to the precise form shown, nor to the number of clutch attachments that may be employed; but I have simply shown a number of them in order to indicate its general adaptation for all purposes, especially as a jeweler's lathe.

This lathe is well adapted for all purposes for which a lathe may be employed, whether upon a large scale or upon a small scale, but is more especially adapted to lathes for fine work—as, for instance, jewelers' and watchmakers' lathes.

What I claim is—

1. The combination, with the hollow spindle B and threaded rod E, of the head $B^1$, cap C, plates $B^2$ $B^3$, and spring $b^4$, substantially as set forth.

2. The combination, with the hollow spindle B, threaded rod $B^1$, and cap C, of the plate $B^2$, provided with a threaded hole for the attachment of a chuck, said plate being secured between the cap and head, and adapted to be moved radially and secured in desired position by the threaded rod E and a plate bearing against the side of plate $B^2$, substantially as set forth.

3. The combination, with a hollow spindle B, threaded rod E, and spring $b^4$, of a recessed head fastened to the end of the hollow spindle, cap C, and a plate, $B^2$, located between said recessed head and cap, and adapted to be moved radially therein and secured in any desired position by the screw-threaded rod E and plate $B^3$, interposed between the end of rod E and plate $B^2$, the latter provided with a threaded hole for the attachment of a chuck, substantially as set forth.

4. The combination, with a hollow spindle, B, threaded rod E, and spring $b^4$, the latter surrounding the end of rod E, of a recessed head secured to the end of the hollow spindle, the cap C, a plate, $B^2$, located between said recessed head and cap, and adapted to be moved radially therein, said plate being provided with a threaded hole for the attachment of a chuck, and a plate, $B^3$, for distributing the pressure of the screw-threaded rod E upon plate $B^2$, substantially as set forth.

5. The primary clamping device H, provided with the circular multiple jaws $H^1$, and adapted to fit into a clutch, G, whereby it may be attached to the plate $B^2$, substantially as and for the purposes described.

In testimony whereof I have signed my name to this specification in the presence of two subscribing witnesses.

JOSEPH KESSELMEIER.

Witnesses:
  R. W. JOHNSTON,
  EDWARD HORN.